United States Patent
Roth et al.

(10) Patent No.: US 9,637,662 B2
(45) Date of Patent: May 2, 2017

(54) MULTI-STAGE METHOD FOR THE COATING OF STEEL PRIOR TO HOT FORMING

(71) Applicant: Henkel AG & Co. KGaA, Duesseldorf (DE)

(72) Inventors: Marcel Roth, Duesseldorf (DE); Reiner Wark, Wuppertal (DE); Thomas Moeller, Duesseldorf (DE); Eva Wilke, Duesseldorf (DE); Uta Sundermeier, Leichlingen (DE); Manuela Goeske-Krajnc, Hilden (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 19 days.

(21) Appl. No.: 14/737,637

(22) Filed: Jun. 12, 2015

(65) Prior Publication Data
US 2015/0275044 A1  Oct. 1, 2015

Related U.S. Application Data

(63) Continuation of application No. PCT/EP2013/076566, filed on Dec. 13, 2013.

(30) Foreign Application Priority Data

Dec. 17, 2012  (EP) .................................... 12197454

(51) Int. Cl.
| | | |
|---|---|---|
| *C09D 183/04* | (2006.01) | |
| *C09D 5/10* | (2006.01) | |
| *C09D 183/02* | (2006.01) | |
| *B05D 3/00* | (2006.01) | |
| *B05D 7/14* | (2006.01) | |
| *C08K 3/08* | (2006.01) | |
| *C21D 8/02* | (2006.01) | |

(52) U.S. Cl.
CPC ........... *C09D 183/04* (2013.01); *B05D 3/007* (2013.01); *B05D 7/14* (2013.01); *C09D 5/103* (2013.01); *C09D 183/02* (2013.01); *C08K 3/08* (2013.01); *C08K 2003/0812* (2013.01); *C08K 2003/0837* (2013.01); *C21D 8/0278* (2013.01); *Y10T 428/265* (2015.01)

(58) Field of Classification Search
CPC ........ C09D 183/04; B05D 7/14; B05D 3/007; C08K 2003/0812; C08K 2003/0837
See application file for complete search history.

(56) References Cited

U.S. PATENT DOCUMENTS

| | | | | |
|---|---|---|---|---|
| 2007/0238257 A1 * | 10/2007 | Paar | .......................... | C09D 5/10 438/305 |
| 2010/0098956 A1 | 4/2010 | Sepeur et al. | | |
| 2012/0187343 A1 | 7/2012 | Matzdorf et al. | | |

FOREIGN PATENT DOCUMENTS

| | | |
|---|---|---|
| DE | 102005059614 A1 | 6/2007 |
| DE | 102008020216 A1 | 10/2009 |
| EP | 1809714 B1 | 2/2010 |
| JP | 2010 131665 * | 6/2010 |
| WO | 2006040030 A1 | 4/2006 |
| WO | 2007076766 A2 | 7/2007 |
| WO | 2009021489 A2 | 2/2009 |

OTHER PUBLICATIONS

JP 2010 131665 translation (2010).*
International Search Report for PCT/EP2013/076566, mailed Apr. 17, 2014, 2 pages.

* cited by examiner

*Primary Examiner* — Kuo-Liang Peng
(74) *Attorney, Agent, or Firm* — Mary K. Cameron

(57) ABSTRACT

The present invention relates to a method for applying a weldable anti-scale coat to steel, comprising producing a thin silicatic layer free from metal pigments on the metallic steel surface, and subsequently applying and curing a wet film of a curable, pigment-containing paint; wherein said paint comprises, in solution in a liquid phase, a binder, comprising hydrolysates and/or condensates of at least one silane/siloxane and/or at least one silicone resin; at least one particulate metallic pigment of Al and at least one particulate metallic pigment of Bi. The present invention also relates to application of an organic paint film system obtainable in the method of the invention, a paint formula useful in the method of the invention, a hot forming operation on steel coated in the method of the invention; and a hot-formed steel component suitable for electrical spot welding processes.

18 Claims, No Drawings

MULTI-STAGE METHOD FOR THE COATING OF STEEL PRIOR TO HOT FORMING

The present invention relates to a multi-stage method for applying a weldable anti-scaling protective layer to steel, in which initially a thin silicatic layer free of metal pigments is produced on the metallic steel surface, and a wet film of a curable, pigment-containing paint is subsequently applied and cured, wherein the curable, pigment-containing paint contains a binder which is dissolved in a liquid phase and which comprises hydrolysates and/or condensates of at least one silane/siloxane and/or at least one silicone resin, and contains at least one metallic pigment of aluminum as well as at least one metallic pigment of bismuth, in each case in particulate form. The present invention further relates to a preferred curable, pigment-containing paint formulation for use in the method according to the invention, and to a hot forming process of semi-finished products made of steel which are coated in the method according to the invention. The present invention likewise encompasses a hot-formed steel component, obtainable in the method according to the invention, which is suitable for electric spot welding methods and for applying a corrosion-protective layer buildup of organic paint.

In automobile manufacturing, some components of the vehicle body are made of high-strength special steels, which for the same stability of the component allow less use of material. These special steels are often boron-manganese-alloyed steels (22MnB5 type) which have the property that, when heated to temperatures above the recrystallization temperature and subsequently cooled quickly, which prevents a diffusion-related phase change of the austenitization, results in high-strength steels. In the hot forming, the semi-finished product made of steel is formed and hardened in one process. During the hot forming, the semi-finished product made of steel, usually a steel sheet, which is heated to the austenitic range and which optionally has already been preformed during cold forming, is formed in the red-hot state and subsequently quenched in a controlled manner. The process of hot forming, by its nature, results in significant scaling of the steel surface during heating to 800-1000° C., which requires considerable effort to reduce the development of scaling layers to the greatest extent possible. The heating in the furnace of the hot forming process often takes place under a protective gas atmosphere, also to prevent carbonization of the steel surface. However, this measure is very complicated, and by no means is sufficient to completely suppress the scaling of the steel surface during the transfer of the semi-finished product from the furnace into the press. The scaling layers which nevertheless form in the hot forming process are suitable neither for the subsequent production processes such as spot welding, nor for the follow-up processes which are typical in metal surface treatment, such as phosphating and electrophoretic coating, so that the scaling layers must be laboriously removed from the formed component, usually by mechanical methods such as sandblasting or dry ice blasting, which in addition to the additional effort also results in significant material loss.

For this reason, in the prior art a thin metal layer, for example calorization, is applied to the steel surface, so that the direct contact of the steel surface with oxygen is prevented in this manner, and only a thermally stable, relatively thin aluminum oxide layer is formed during the hot forming. The advantage of this calorization is that the hot-formed semi-finished products, formed into components, can easily be spot welded, so that these components coming from the hot forming process may be joined to other metallic components in a conventional manner, for example to form an automobile body. In addition, after the oxide layer is pickled off, well-adhering organic paint systems, after prior conversion treatment such as phosphating, may be built up on the calorized, hot-formed semi-finished products which are formed into components.

However, the application of calorization is an energy-intensive process, so that in the more recent patent literature it has been proposed to apply aluminum-pigmented inorganic paint systems, based on silicone resins, directly to the steel surface as an anti-scaling protective layer. EP 1809714 B1 discloses these types of protective layers for the hot forming of boron-manganese alloyed steels, and states that in this way as well, coatings which provide excellent protection from scaling may be achieved, and which after the hot forming may also be spot welded and painted over.

With respect to this prior art, the object of the present invention is, on the one hand, to further increase the anti-scaling protection of substantially inorganic coatings of the type in EP 1809714 B1, without losses in spot weldability, and on the other hand, to provide a method for coating steel which is suitable for hot forming, resulting in steel components after the hot forming process which, with a subsequent conventional organic paint layer buildup, have greatly improved protection from corrosive delamination.

It has surprisingly been found that excellent anti-scaling protection of steel in the hot forming, and very good spot weldability of the hot-formed steels, may be achieved with coatings based on hydrolysates or condensates of silanes/siloxanes and/or at least one silicone resin, additionally containing metallic pigments of aluminum and bismuth. To ensure good adhesion of the coating during the hot forming process, and thus, good anti-scaling protection per se, initially a silicatic precoating of the steel surface takes place before the above-mentioned pigment-containing coating based on hydrolysates or condensates of silanes/siloxanes and/or a silicone resin is applied. The thin silicatic layer also surprisingly results in a considerable reduction of corrosive delamination of organic paint layers applied after the hot forming, in particular of electrophoretic coatings.

The object of the present invention is thus achieved by a multi-stage method for applying a weldable anti-scaling protective layer to steel, in which initially a thin silicatic layer free of metal pigments is produced on the metallic steel surface, and a wet film of a curable, pigment-containing paint is subsequently applied and cured, wherein the curable, pigment-containing paint contains a binder which is dissolved in a liquid phase and which comprises hydrolysates and/or condensates of at least one silane/siloxane and/or at least one silicone resin, and contains at least one metallic pigment of aluminum as well as at least one metallic pigment of bismuth, in each case in particulate form.

According to the invention, "metallic steel surface" refers to steel surfaces from which oils and rust film have been removed. This type of surface may be provided using wet chemical methods, for example by means of alkaline pickling solutions, which are known to those skilled in the art in the field of metal surface treatment.

Within the scope of the present invention, a "thin layer" is understood to mean a thin coating on the metallic substrate surface, having a layer thickness of less than 0.5 μm.

According to the invention, thin layers are "free of metal pigments" when they contain less than 1% by weight of metallic pigments.

According to the invention, "silicatic" refers to thin layers having condensed $SiO_4$ units.

According to the invention, a metallic pigment of aluminum is composed of at least 90 at.-% aluminum. According to the invention, a metallic pigment of bismuth is composed of at least 60 at.-% bismuth.

Within the meaning of the present invention, a paint is curable when, by drying, with or without use of technical measures for targeted supplying of heat, it forms a solid which at 20° C. has a solubility in deionized water (K<1 $\mu Scm^{-1}$) of less than 0.01 g/L.

In the method according to the invention, the binder of the curable, pigment-containing paint is selected from hydrolysates/condensates of silanes/siloxanes and/or from silicone resins. Such substantially inorganic binders typically begin to pyrolyze at temperatures above 300° C., forming a pure silicatic matrix which encloses the mentioned metallic pigments. Accordingly, in the method according to the invention, this silicatic matrix already forms in the furnace during heating of the steel substrate, coated according to the invention, directly prior to the forming. During the forming process, under the high pressure of the pressing and forming tools, layers of a ceramic coating form which resemble the sintered layers of silicates, and which therefore have correspondingly high mechanical and thermal stability. At the same time, the metallic pigments of the pyrolyzed paint coating go into the molten state at the hot forming temperature. Thus, in the hot forming process of the steel substrate coated in the method according to the invention, a conversion of the cured paint coating into a ceramic silicatic coating containing metallic phases of aluminum and bismuth takes place. Due to the thin silicatic layer, free of metal pigments, that is applied as an intermediate coating in the method according to the invention, this conversion surprisingly is not accompanied by layered flaking of the pyrolyzed coating containing the metal pigments, so that the metal substrate is further optimally protected from scaling during the pyrolytic conversion of the cured paint coating in the heating phase and during the hot forming. In addition, due to the excellent adherent base for the pyrolyzed pigment-containing paint as a result of the thin silicatic layer which is free of metal pigments, an organic paint layer buildup carried out after the hot forming process is delaminated to a much lesser extent in the event of exposure to corrosive media.

Accordingly, the thin silicatic layer free of metal pigments, which is to be applied in a method according to the invention before the coating with the curable, pigment-containing paint takes place, has a key function. As an intermediate layer it stabilizes the adhesion of the pigment-containing paint coating, which protects from scaling, in the heating phase of the hot forming process, in which pyrolysis is completed to form a pure silicatic coating, and thus ensures that the silicated coating containing metal pigments is still able to effectively protect the substrate from scaling. Furthermore, it has been shown that an organic layer buildup, for example an electrophoretic coating, taking place after the hot forming of steel substrates coated according to the invention is better protected from corrosive delamination in comparison to hot-formed steels to which no thin silicatic layer free of metal pigments has been applied.

It has been shown that such thin silicatic layers free of metal pigments have particularly good adhesion-promoting properties in steel substrates which are coated according to the invention for the purpose of hot forming, for which an atomic ratio of silicon to oxygen of less than 2:3 in the thin silicatic layer is achieved. Such thin silicatic layers free of metal pigments are therefore preferably to be produced in a method according to the invention.

The atomic ratio of silicon to oxygen in the thin silicatic layer may be determined by glow discharge optical emission spectroscopy (GD-OES), wherein for the quantification, a calibration on an $SiO_2$ coating (atomic ratio Si:O of 1:2) sputtered on from the gas phase is to be carried out.

Furthermore, it is advantageous when the thin silicatic layer, free of metal pigments, in the method according to the invention is applied in such a coating layer that at least 10 mg/m$^2$, particularly preferably at least 40 mg/m$^2$, based on the element silicon, result in order to achieve sufficient adhesion of the cured coating of the pigment-containing paint during the hot forming process. However, the coating layer is preferably less than 200 mg/m$^2$, since otherwise the weldability of the semi-finished products of steel, coated according to the invention, is greatly impaired after the hot forming due to the electrically insulating properties of the thin silicatic layer.

The thin silicatic layer free of metal pigments may be applied by methods known in the prior art. Such methods include physical vapor deposition (PVD), chemical vapor deposition (CVD), and plasma coating methods. In the PVD method, the thin oxidic layer containing silicon is obtained by sputter deposition, for example, in which appropriate sputter targets made of $SiO_2$ are bombarded with an ion source under high vacuum, and molecular fragments of the target are converted to the gas phase, from which the deposition onto the substrate takes place. Since PVD methods are usable only under vacuum conditions, which, for example in quasi-continuous operation of a conveyor system, can be achieved only with great difficulty and with significant effort, CVD methods are preferred in the method according to the invention for applying the thin silicatic layer. CVD methods, which may be used at atmospheric pressure, are pyrolytic methods which use silicon-containing precursor compounds (combustion chemical vapor deposition (CCVD) method).

In one preferred embodiment of the method according to the invention, the thin silicatic layer which is free of metal pigments is produced from the gas phase in a pyrolytic method, in which an organosilane, preferably selected from tetraalkoxysilanes containing no more than 5 carbon atoms per alkoxy group, is mixed with a combustible carrier gas, and together with the carrier gas is brought to combustion in a flame, the thin oxidic layer containing silicon being formed on the metal strip within an area defined by the flame. Such thin silicatic layers deposited from the gas phase in a flame pyrolytic method have excellent adhesion to the metallic substrate, and have a high degree of homogeneity with regard to their elemental composition. To obtain thin silicatic layers which adhere strongly in the method according to the invention, the combustible mixtures used in the pyrolytic method preferably contain no more than 2% by weight of the organosilane. The carrier gas is preferably selected from a mixture containing oxygen and hydrogen or from combustible liquefied gases, which in turn are preferably selected from alkanes containing at least 3 carbon atoms but not more than 10 carbon atoms, or from a mixture of these alkanes.

However, wet chemical methods are also particularly suited for producing a thin silicatic layer, since they allow simple application using dip, casting, spray, or roller application methods or centrifugal casting methods, and therefore the level of technical effort is low. The wet chemical application is therefore preferred in the method according to the invention.

Of the wet chemical methods, for example methods referred to in the prior art as sol-gel methods are suitable. In this regard, tetraalkoxysilanes in aqueous solution are preferably used, which upon drying crosslink to form polymeric inorganic $SiO_2$ framework structures. This particular wet chemical method is typically carried out to accelerate the crosslinking reaction and to form glass-like coatings at an elevated temperature.

In one particularly preferred method according to the invention, the wet chemical application of the thin silicatic layer is carried out by applying a wet film of an alkaline aqueous composition to the steel surface, the wet film preferably being dried prior to the application of the curable, pigment-containing paint, wherein the alkaline aqueous composition contains:

a. water glass with a molar ratio of $SiO_2$ to $M_2O$ of at least 3:2, but not greater than 7:1, M being selected from alkali metals and/or quaternary ammonium compounds, and b. one or more organosilanes (A) which in each case contain at least one hydrolyzable substituent which during hydrolysis is cleaved as an alcohol having a boiling point below 100° C. at an atmospheric pressure of 1 bar, and which bear one to three nonhydrolyzable substituents on the respective silicon atom, the total number of substituents on the respective silicon atoms of the organosilanes (A) being four, c. wherein the molar ratio of the total quantity of organosilanes having at least one hydrolyzable substituent, based on the element silicon, to the total quantity of silicon atoms in the alkaline aqueous composition is less than 1:3, but preferably at least 1:20, particularly preferably at least 1:10.

Within the meaning of the present invention, organosilanes (A) thus have at least one covalent Si—C bond via which a so-called "nonhydrolyzable substituent" is bound to the silicon atom. In contrast, organosilanes having hydrolyzable substituents form Si—O bonds in water, with cleavage of the substituent.

In one method according to the invention, in which the wet chemical application of a thin silicatic layer free of metal pigments takes place by means of the alkaline aqueous composition, the molar ratio of all such silicon-containing compounds, which represent none of the compounds mentioned under a) and b), based on the element silicon, to the total quantity of silicon atoms is preferably less than 1:20.

In the method according to the invention, the organosilanes (A) of the alkaline aqueous composition for the wet chemical application of the thin silicatic layer are preferably selected from those organosilanes in which at least one nonhydrolyzable substituent contains at least one primary amino group. Such organosilanes (A) significantly improve the corrosion-protective properties of the semi-finished products made of steel which are coated and hot-formed according to the invention, in particular when an organic paint layer buildup, for example via an electrophoretic coating, subsequently takes place.

An application solution preferred in the method according to the invention for applying the wet film of the alkaline aqueous composition contains:

a. 1-25% by weight, based on $SiO_2$, of water glass with a molar ratio of $SiO_2$ to $M_2O$ of at least 3:2 but not greater than 7:1, M being selected from alkali metals and/or quaternary ammonium compounds;

b. 0.2-10% by weight, based on the element silicon, of organosilanes (A) which in each case contain at least one hydrolyzable substituent which during hydrolysis is cleaved as an alcohol having a boiling point below 100° C. at an atmospheric pressure of 1 bar, and which bear one to three nonhydrolyzable substituents on the respective silicon atom which contain at least one primary amino group, the total number of substituents on the respective silicon atoms of the organosilanes (A) being four;

c. no more than 2% by weight, preferably no more than 1% by weight, particularly preferably no more than 0.5% by weight, based on the element silicon, of organosilanes which in each case contain at least one hydrolyzable substituent, but which are not organosilanes (A);

d. no more than 0.5% by weight, preferably no more than 0.1% by weight, based on the element silicon, of organosilanes containing hydrolyzable substituents which cleave hydrogen halides upon their hydrolysis;

e. no more than 1.0% by weight, preferably no more than 0.5% by weight, particularly preferably no more than 0.1% by weight, based on the element silicon, of silanes in each case containing four hydrolyzable substituents; and preferably f. no more than 0.5% by weight, particularly preferably no more than 0.1% by weight, of other silicon-containing compounds which do not represent any of the compounds mentioned under a)-e), g. wherein the molar ratio of the total quantity of organosilanes having at least one hydrolyzable substituent, based on the element silicon, to the total quantity of silicon atoms in the alkaline aqueous composition is less than 1:3, but preferably at least 1:20, particularly preferably at least 1:10.

The application of this first coating, which represents a thin silicatic layer free of metal pigments, results in an improved adherent base for the actual anti-scaling protective layer, the adhesion also being ensured during the hot forming process, i.e., also after silicating of the crosslinked binder of the actual anti-scaling protective layer. On the other hand, the thin silicatic layer free of metal pigments represents an insulating dielectric, which in principle impairs the electric spot weldability of hot-formed steels provided with anti-scaling protective layers containing metal pigments. Accordingly, the curable, pigment-containing paint should be formulated in such a way that the electric spot weldability after the hot forming of the coated steel is sufficient. The requirements for the spot weldability are more than met in the method according to the invention; additional preferred embodiments of the curable, pigment-containing paint are described below.

For sufficient protection from scaling during hot forming of steel, it is preferred that the curable, pigment-containing paint in the method according to the invention contains the metallic pigment aluminum in a proportion of at least 20% by weight, particularly preferably at least 30% by weight, based on the solids fraction. However, if the proportion of metallic pigments of aluminum is above 60% by weight, based on the solids fraction, paste-like paint formulations result which on the one hand are difficult to apply, and on the other hand provide very brittle coatings after curing which are no longer formable without cracks and flakes occurring. Therefore, in the method according to the invention, the paint preferably contains no more than 60% by weight of metallic pigments of aluminum, based on the solids fraction.

While maintaining the anti-scaling protection during the hot forming process, excellent properties of the coating provided in the method according to the invention with regard to weldability, in particular spot weldability, after hot forming of the semi-finished products made of steel are achieved in particular when the weight ratio of the metallic pigments of aluminum to the metallic pigments of bismuth in the paint, based on the respective metallic element, is in the range of 2:1 to 15:1, in particular in the range of 4:1 to 10:1. Such weight ratios of the metallic pigments relative to one another are therefore preferably to be set in paints of the method according to the invention.

In addition, it is advantageous when the metallic pigments of aluminum in the paint of the method according to the invention are present in the form of flakes, since during application of a wet film of the paint, such flakes tend to align over the steel surface in an overlapping, scale-like manner, so that the anti-scaling protection may be further optimized in this way. For this purpose, such aluminum flakes are preferably used in the paint of the method according to the invention which are commercially available as a powder or paste, and which in this usage form have a ratio of thickness to diameter in the range of 1:50 to 1:500, the D50 value preferably being in the range of 2 to 10 µm. Regardless of the flake dimensions, the D50 value is determined from cumulative particle size distributions ascertained from dynamic light scattering measurements, the D50 value indicating that 50% by volume of the pigment particles have an experimentally determined particle size below the stated value.

With regard to the type of metallic pigments of bismuth, spherical particle shapes are preferred in the paint of the method according to the invention when aluminum flakes are used at the same time, in order to not eliminate the overlapping alignment of the aluminum flakes which is necessary for the improved anti-scaling protection.

Overall, such paints are preferably used in the method according to the invention for which the particulate solids fraction, i.e., the proportion which includes the metallic pigments, assumes a D90 value of less than 50 µm, particularly preferably less than 10 µm. This D90 value indicates that 90% by volume of the particulate solids fraction has a diameter below the stated value. The D90 value may be determined in samples of the paint diluted with suitable solvents, with reference to volume-weighted cumulative distribution curves which are available via dynamic light scattering methods.

In one preferred method according to the invention, the total content of the metallic pigments of aluminum and bismuth, based on the particulate solids fraction of the paint, is at least 80% by weight, particularly preferably at least 90% by weight, and more particularly preferably at least 95% by weight. It is thus ensured that the cured paint coating on the one hand has sufficient electrical conductivity and thus, spot weldability, and on the other hand has excellent anti-scaling protection during hot forming.

The binder of the curable, pigment-containing paint in the method according to the invention is selected from hydrolysates/condensates of silanes and/or siloxanes, and from silicone resins. In particular, alkoxylated silanes having at least one covalent silicon-carbon bond are suited as silanes, wherein aliphatic radicals which additionally may also be present substituted with polar functional groups such as amino, hydroxyl, carboxyl, and glycidyl groups are preferably bound via the Si—C bond. These silanes, as binder, are then usually present dissolved in polar solvents containing water, and are able to condense by cleavage of alcohols, so that during the curing a polymeric network results, with the formation of siloxane units.

Silicone resins are particularly suitable binders in pigment-containing paints of the method according to the invention. Silicone resins are made up of siloxane units, and are obtained by condensation of differently aliphatically substituted silanes, the structure and degree of crosslinking of the silicone resin being determined essentially by the type and the relative quantity ratio of these silanes. The silicone resins are therefore characterized via the ratio of the different siloxane structural units in the polymeric network. One Si—O linkage is present in monofunctional (M) siloxane units, two Si—O linkages are present in difunctional (D) siloxane units, three Si—O linkages are present in trifunctional (T) siloxane units, and four Si—O linkages are present in tetrafunctional (Q) siloxane units. In the method according to the invention for the curable, pigment-containing paint, highly crosslinked silicone resins are preferred which are made up of T- and D-functional siloxane units, the molar ratio of T-functional to D-functional siloxane units preferably being between 15:1 and 5:1, particularly preferably between 15:1 and 10:1.

In the method according to the invention, the binder of the paint is preferably present dissolved in a liquid phase. Silicone resins are typically well soluble in slightly polar to apolar solvents such as acetone, ethyl acetate, toluene, and xylene, and in glycol ethers. Since it is advantageous when the solvent of the paint evaporates slowly during drying and curing of the paint, organic solvents having boiling points above 100° C. are preferred.

The total content of the binder, in particular of the silicone resins, in paints of the method according to the invention is preferably at least 80% by weight, particularly preferably at least 90% by weight, in each case based on the dissolved solids fraction. Within the scope of the present invention, the solids fraction is understood to mean the solvent-free portion of a formulation which remains behind as a solid after the formulation dries. Accordingly, the dissolved solids fraction of a formulation is the dried residue minus the particulate solids fractions formerly undissolved in the formulation.

It has been shown that in the method according to the invention, for good anti-scaling protection during hot forming and good weldability and good electrophoretic coatability of the hot-formed semi-finished products made of steel, such paints are preferably to be applied for which the weight-based metal pigment-binder ratio is at least 1:3. However, this ratio is preferably not greater than 3:2, particularly preferably not greater than 1:1, in order to be able to sufficiently incorporate the metal pigments into the cured binder, and thus, to achieve homogeneous coatings.

The application of the curable, pigment-containing paint may take place in the method according to the invention using the application methods known in the prior art. In the cases in which flat products made of steel are to be coated, the application preferably takes place in the roller application method.

In a method according to the invention, for setting a paint layer thickness which results in sufficient anti-scaling protection during hot forming, during application of the paint it should preferably be ensured that the applied wet film of the paint has a solids fraction of at least 2 g, preferably at least 4 g, based on the square meters of the steel surface wetted with the wet film. However, preferably no such wet films should be applied for which the solids fraction is above 30 g, based on the square meters of the steel surface wetted with the wet film, since otherwise the weldability of the hot-formed steel surface coated according to the invention is significantly reduced without a further improvement of the anti-scaling protection in the hot forming.

In one preferred method according to the invention, the curing of the paint which is applied as a wet film to the steel surface provided with the thin silicatic layer is carried out at a maximum metal substrate temperature (PMT) in the range of 150° C.-250° C.

In addition, it is preferred that in the method according to the invention, flat products of steel are particularly preferably coated in the form of a flat strip or sheets.

Hot-formable steels are preferably coated in the method according to the invention. These types of steels are, for example, duplex steels alloyed with chromium, nickel, and manganese, and boron-manganese-steels.

In one preferred embodiment, boron-manganese-steels having the following alloy composition are coated in the method according to the invention:

0.04-0.5% by weight carbon
0.5-3.5% by weight manganese
0.01-1.0% by weight chromium
0.0006-0.015% by weight boron
less than 1.0% by weight silicon
less than 0.2% by weight titanium
less than 2.0% by weight aluminum
less than 0.1% by weight phosphorus
less than 0.015% by weight nitrogen
less than 0.05% by weight sulfur,
with the remainder iron and unavoidable impurities.

Furthermore, the present invention encompasses a curable, pigment-containing paint formulation which is particularly suitable, in the cured state, for ensuring excellent anti-scaling protection on a semi-finished product made of steel provided with a thin silicatic layer during the hot forming of the steel, and also suitable for providing the coated steel with very good weldability after the hot forming. Such a paint formulation according to the invention contains 10-40% by weight, preferably 20-35% by weight, of at least one silicone resin;
10-30% by weight, preferably 15-25% by weight, of particulate aluminum;
1-10% by weight, preferably 2-7% by weight, of particulate bismuth;
20-60% by weight, preferably 30-50% by weight, of organic solvents;
less than 5% by weight of water; and
less than 5% by weight of conventional paint additives selected from pigments, fillers, flow control agents, anti-settling agents, and/or rheological additives,
wherein the weight ratio of the metallic pigments of aluminum to the metallic pigments of bismuth, based on the respective metallic element, is in a range of 2:1 to 15:1, preferably in a range of 4:1 to 10:1.

The content of fillers and pigments, which in each case do not represent metallic pigments, is preferably less than 4% by weight, particularly preferably less than 2% by weight, more particularly preferably less than 1% by weight.

Further preferred embodiments of the curable, pigment-containing paint formulation according to the invention may be obtained from the previous description of the corresponding curable, pigment-containing paint system which is applied in the coating method according to the invention.

In addition, the present invention encompasses a hot forming process in which a semi-finished product made of steel is initially coated in a method according to the invention as described above, and is subsequently hot formed, preferably at a hot forming temperature of at least 800° C.

It has surprisingly been found that after the hot forming, the steel substrates coated according to the invention not only have excellent spot weldability, but also allow a more effective corrosion layer buildup compared to hot-formed anti-scaling protective layers that are applied directly, i.e., without a thin silicatic layer free of metal pigments. Within the meaning of the present invention, a corrosion-protective paint buildup comprises the application of an inorganic conversion layer, for example phosphating, and/or the application of organic paint systems, for example an electrophoretic coating. Thus, it has been determined, for example, that the corrosive delamination of organic electrophoretic coatings on phosphated hot-formed steel components coated according to the invention may be significantly reduced. This is the case in particular when the formation of the thin silicatic layer has been applied prior to the application of the anti-scaling protective layer in the form of the curable, pigment-containing paint by wet chemical means using alkaline aqueous compositions, as described above.

Accordingly, the present invention also encompasses a hot-formed steel component that is suitable for electric spot welding methods and for applying a corrosion-protective organic paint layer buildup, which on its surface has a silicatic coating in a total layer thickness of 1-10 µm, wherein the silicatic coating contains metallic phases of aluminum and bismuth, obtainable in a hot forming process according to the present invention.

Preferred embodiments of the hot-formed steel component are obtainable via the above-described preferred embodiments of the multi-stage method according to the invention for applying a weldable anti-scaling protective layer to a semi-finished product made of steel and subsequently hot forming the semi-finished product to form the steel component, at a hot forming temperature of at least 800° C.

EXEMPLARY EMBODIMENTS

The properties of various anti-scaling protective layers were determined below after an annealing process typical for hot forming. Thus, steel sheets of type 22MnB5 were initially coated, with or without application of a thin silicatic layer, with a paint formulation containing a silicone resin and metal pigments according to Table 1, and cured at a furnace temperature of 300° C. until a PMT of 180° C. was achieved, a dry film thickness of 2 µm having been set in each case. The steel sheets coated in this way were then annealed in the furnace for 7 minutes at 950° C., without protective gas, and appropriate measurements were performed on the annealed coatings.

TABLE 1

Compositions of the curable, pigment-containing paint

|  | E1 | E2 | CE1 |
| --- | --- | --- | --- |
| Silicone resin molar ratio T/D = 12.3 | 25.65 | 23.35 | 30.42 |
| Aluminum flakes D50 value = 5 µm | 14.13 | 13.05 | 19.70 |
| Bismuth powder D90 value = 50 µm | 2.86 | 16.10 | — |
| Xylene | 9.25 | 8.52 | 10.97 |
| n-Butoxypropanol | 48.11 | 38.48 | 38.91 |
| Total | 100 | 100 | 100 |
| Pigment-binder ratio | 0.66 | 1.25 | 0.65 |
| Al:Bi weight ratio | 4.9 | 0.8 | — |

No appreciable scaling or even the formation of a scaling layer was observable on any of the steel sheets coated according to Table 2 after annealing in the furnace at 950° C.

TABLE 2

Properties of the anti-scaling protective layer on steel (22MnB5) after annealing for 7 minutes at 950° C.

|  | E1 | | CE1 | |
|---|---|---|---|---|
| Thin silicatic layer # (50 mg/m² Si) | No | Yes | No | Yes |
| Adhesion [1] | Not acceptable | Acceptable | Acceptable | Acceptable |
| Corrosion protection [2] | Acceptable | Acceptable | Not acceptable | Acceptable |
| Weldability [3] | 126 | 120 | <20 | <10 |

The thin silicatic layer was produced by applying an appropriate wet film of an alkaline aqueous composition composed of 2% by weight potassium water glass 28/30 and 0.4% by weight 3-aminopropyltrimethoxysilane, and subsequent drying at 80° C. for 15 minutes
[1] Determined according to the adhesive strip peel test (no paint residues on adhesive tape = Acceptable)
[2] Determined according to the adhesive strip peel test at the scribe after zinc phosphating and electrophoretic coating (approximately 20 μm EV2007, PPG) of the annealed coated steels after 72 hours in the continuous condensed water test at 40° C. and 100% humidity, in accordance with DIN EN ISO 6270-2 (no paint residues on adhesive tape = Acceptable)
[3] Number of possible weld points using a spot welder (DALEX PMS 11-4; welding current 7 kA, electrode contact force 4.5 kN, welding duration 18 periods, F16 copper electrodes)

The adhesion of the annealed coatings to the steel sheets was tested by means of the adhesive strip peel test. It was shown that the additional presence of bismuth in the paint formulation reduces the adhesion of the coating after the annealing at 950° C. (E1 compared to CE1, in each case without a thin silicatic layer).

For steel sheets coated according to the invention, to which a thin silicatic layer had been applied prior to application of the paint formulation according to Table 1, the weakening of the adhesion caused by the bismuth portion was once again eliminated, and good adhesion of the coating was determined (E1 with a thin silicatic layer). The steel sheets that were coated with a paint formulation E2 and subsequently annealed had poorer adhesion than the sheets coated with the paint formulation E1, and were not investigated further. This is attributed to the unfavorable weight ratio of the metal pigments, which is characterized by a high relative bismuth portion.

However, admixing a portion of particulate metallic bismuth greatly improves the electric spot weldability. This is regardless of whether the paint formulation has been applied directly to the steel surface or to the initial silicatic coating.

It is noteworthy that all annealed steel sheets could be zinc phosphated and electrophoretically coated. The stability of such a layer buildup against corrosive delamination was determined in the condensed water test. It was shown that the steel sheets that were annealed and appropriately subsequently coated achieved a good result in the adhesive strip peel test when the steel sheets were initially coated with a thin silicatic layer prior to the annealing process.

Overall, the steel sheets coated according to the invention showed excellent spot weldabiilty, good adhesion to the steel substrate, and the best corrosion results after the corrosion-protective layer buildup.

What is claimed is:

1. A multi-stage method for applying a weldable anti-scaling protective layer to steel, comprising stages of:
   a) initially producing a thin silicatic layer free of metal pigments on a metallic steel surface; and
   b) subsequently after stage a) applying on the thin silicatic layer free of metal pigments, a wet film of a curable, pigment-containing paint and curing said paint thereon; wherein the curable, pigment-containing paint comprises:
      1) a binder, dissolved in a liquid phase and comprising at least one of hydrolysates of at least one silane, condensates of at least one silane, hydrolysates of at least one siloxane, condensates of at least one siloxane, a silicone resin and mixtures thereof;
      2) at least one metallic pigment of aluminum in particulate form; and
      3) at least one metallic pigment of bismuth, in particulate form.

2. The method according to claim 1, wherein aluminum is present in the paint in an amount of at least 20% by weight, based on solids fraction, but does not exceed 60% by weight.

3. The method according to claim 1, wherein the paint has a weight ratio of the metallic pigments of aluminum to the metallic pigments of bismuth, based on the respective metallic element, in a range of 2:1 to 15:1.

4. The method according to claim 1 wherein the metallic pigments of aluminum are present in the paint as flakes.

5. The method according to claim 1 wherein the metallic pigments of bismuth in the paint have a spherical shape.

6. The method according to claim 1 wherein the particulate solids fractions of the paint have a D90 value of less than 50 μm.

7. The method according to claim 1 wherein a total content of the metallic pigments of aluminum and bismuth, based on the particulate solids fraction of the paint, is at least 80% by weight.

8. The method according to claim 1 wherein the binder of the paint is selected from at least one silicone resin made up of T- and D-functional siloxane units, wherein the molar ratio of T-functional to D-functional siloxane units is between 15:1 and 5:1.

9. The method according to claim 8, wherein a total content of the at least one silicone resin, based on a dissolved solids fraction of the paint, is at least 80% by weight.

10. The method according to claim 1 wherein the paint has a weight-based metal pigment to binder ratio of at least 1:3, but not greater than 3:2.

11. The method according to claim 1 wherein the thin silicatic layer free of metal pigments is applied by wet chemical means, and a drying step follows prior to application of the curable pigment-containing paint.

12. The method according to claim 11, wherein the thin silicatic layer free of metal pigments is applied by bringing the metallic steel surface into contact with an alkaline aqueous composition containing:
   a) water glass with a molar ratio of $SiO_2$ to $M_2O$ of at least 3:2, but not greater than 7:1, M being selected from alkali metals and/or quaternary ammonium compounds, and
   b) one or more organosilanes (A) which in each case contain at least one hydrolyzable substituent, which during hydrolysis is cleaved as an alcohol having a boiling point below 100° C. at an atmospheric pressure of 1 bar, and which bear one to three nonhydrolyzable substituents on the respective silicon atom, the total number of substituents on the respective silicon atoms of the organosilanes (A) being four,
   wherein the molar ratio of the total quantity of organosilanes having at least one hydrolyzable substituent, based on the element silicon, to the total quantity of silicon atoms is less than 1:3, but at least 1:20.

13. The method according to claim 12, wherein the nonhydrolyzable substituents of the organosilanes (A) of the alkaline aqueous composition contain at least one primary amino group.

14. The method according to claim 1 wherein the thin silicatic layer free of metal pigments is applied to the metallic steel surface in a coating layer of at least 10 mg/m², but not more than 200 mg/m², in each case based on silicon.

16. The method according to claim 1 wherein the wet film of the paint has a solids fraction of at least 2 g, but not more than 30 g, in each case based on square meters of steel surface wetted with the wet film.

16. The method according to claim 1 wherein after the paint is applied a drying step takes place, wherein a maximum metal substrate temperature is at least 150° C., but not greater than 250° C.

17. A hot forming process in which a semi-finished product made of steel is initially coated according to the method of claim 1, and is subsequently hot formed, at a temperature of at least 800° C.

18. A curable pigment-containing paint formulation for applying an anti-scaling protective layer to steel, containing:
  a) 10-40% by weight of at least one silicone resin;
  b) 10-30% by weight of particulate metallic pigment of aluminum;
  c) 1-10% by weight of particulate metallic pigment of bismuth;
  d) 20-60% by weight of organic solvents;
  e) less than 5% by weight of water; and
  f) less than 5% by weight of further paint additives selected from pigments, fillers, flow control agents, anti-settling agents, and rheological additives;
  wherein the formulation has a weight ratio of the particulate metallic pigment of aluminum to the particulate metallic pigment of bismuth, based on the respective metallic element, in a range of 2:1 to 15:1.

* * * * *

UNITED STATES PATENT AND TRADEMARK OFFICE
CERTIFICATE OF CORRECTION

PATENT NO.       : 9,637,662 B2
APPLICATION NO.  : 14/737637
DATED            : May 2, 2017
INVENTOR(S)      : Marcel Roth et al.

Page 1 of 1

It is certified that error appears in the above-identified patent and that said Letters Patent is hereby corrected as shown below:

In the Specification

Column 4, Line 13: Change "200 mg/rn²" to -- 200 mg/m² --.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*